(12) United States Patent
Hamrock et al.

(10) Patent No.: US 6,423,784 B1
(45) Date of Patent: Jul. 23, 2002

(54) ACID FUNCTIONAL FLUOROPOLYMER MEMBRANES AND METHOD OF MANUFACTURE

(75) Inventors: Steven J. Hamrock, Stillwater; Naiyong Jing; Shane S. Mao, both of Woodbury; L. Charles Hardy, Saint Paul, all of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/464,337

(22) Filed: Dec. 15, 1999

(51) Int. Cl.[7] .............................. C08F 8/00; C08L 27/22
(52) U.S. Cl. ................ 525/326.2; 525/326.3; 525/344; 525/366; 525/374
(58) Field of Search ........................... 525/326.2, 326.3, 525/344, 366, 374

(56) References Cited

U.S. PATENT DOCUMENTS

| | | |
|---|---|---|
| 4,894,410 A | 1/1990 | Kolb et al. |
| 4,956,419 A | 9/1990 | Kolb et al. |
| 5,395,886 A | 3/1995 | Caporiccio et al. |
| 5,656,386 A | 8/1997 | Scherer et al. |

FOREIGN PATENT DOCUMENTS

| | | |
|---|---|---|
| JP | 60 231703 | 11/1985 |
| WO | WO 97 00906 | 1/1997 |
| WO | WO 99 38842 | 8/1999 |

OTHER PUBLICATIONS

JP 60–231703 Abstract, Derwent Acc. No. 1986–004337, Derwent Information Ltd. (1986).*

* cited by examiner

Primary Examiner—D. R. Wilson
(74) Attorney, Agent, or Firm—Philip Y. Dahl

(57) ABSTRACT

Methods are provided to make acid functional fluoropolymers by: a) dehydrofluorinating a starting fluoropolymer with a dehydrofluorinating agent to form an unsaturated fluoropolymer; b) adding an acidifiable nucleophilic functionalizing agent to a double bond of the unsaturated fluoropolymer; and c) acidifying the added acidifiable function. Acid functional fluoropolymers and ion conducting membranes thereof are also provided, including acid functional fluoropolymer having pendent groups according to the formula: —X—Ar—$A_n$, wherein X is selected from O, S or NR, where R is selected from H and C1–C30 alkyl or aryl, which are optionally substituted, wherein Ar is a C6–C30 aromatic group, which is optionally substituted, wherein A is an acidic function or salt thereof, wherein a can be independently chosen to be 1, 2 or 3.

11 Claims, 1 Drawing Sheet

ACID FUNCTIONAL FLUOROPOLYMER MEMBRANES AND METHOD OF MANUFACTURE

FIELD OF THE INVENTION

This invention relates to novel methods of synthesizing acid functional fluoropolymers by dehydrofluorination and nucleophilic addition of an acidifiable group, followed by acidification of the acidifiable group to obtain acid functionality. This invention also relates to the polymers and membranes made or modified according to such methods, particularly for use as ion conducting membranes.

BACKGROUND OF THE INVENTION

Electrochemical devices, including proton exchange membrane fuel cells, electrolyzers, chlor-alkali separation membranes, and the like, are typically constructed from a unit referred to as a membrane electrode assembly (MEA). Such MEA's comprise one or more electrode portions, which include a catalytic electrode material such as Pt or Pd, in contact with an ion conductive membrane. Ion conductive membranes (ICMs) are used in electrochemical cells as solid electrolytes. In a typical electrochemical cell, an ICM is in contact with cathode and anode electrodes, and transports ions such as protons that are formed at the anode to the cathode, allowing a current of electrons to flow in an external circuit connecting the electrodes.

In a typical hydrogen/oxygen fuel cell, the ions to be conducted by the membrane are protons. Importantly, ICMs do not conduct electrons/electricity, since this would render the fuel cell useless, and they must be essentially impermeable to fuel gasses, such as hydrogen and oxygen. Any leakage of the gasses employed in the reaction across the MEA results in waste of the reactants and inefficiency of the cell. For that reason, the ion exchange membrane must have low or no permeability to the gasses employed in the reaction.

ICMs also find use in chlor-alkali cells wherein brine mixtures are separated to form chlorine gas and sodium hydroxide. The membrane selectively transports sodium ions while rejecting chloride ions. Such membranes may also be useful in batteries and electrochemical storage cells, particularly membranes that transport lithium ions. ICMs also can be useful for applications such as diffusion dialysis, electrodialysis, and pervaporization and vapor permeation separations. While most ICMs transport cations or protons, membranes that are transportive to anions such as $OH^-$ are known and commercially available.

Commercially-available ICMs are not entirely satisfactory in meeting the performance demands of fuel cells. For example, Nafion™ membranes (DuPont Chemicals, Inc., Wilmington, Del.), which are perfluorocarbon materials having pendent sulfonate groups, are considered expensive and structurally weak when wet. Nafion membranes are not generally available at thicknesses of less than 50 μm. While Nafion membranes with lower equivalent weight can be used to obtain lower ionic resistance, lower equivalent weight membranes are structurally weaker and thus require reinforcement.

The search for new acid-functional fluoropolymers has been impeded by the difficulty inherent in copolymerizing acid-functional fluoromonomers with tetrafluoroethylene or other suitable perfluoro comonomers.

U.S. Pat. No. 4,894,410 and U.S. Pat. No. 4,956,419 (3M) disclose the manufacture of fluoropolymer membranes having various functional groups appended through thio linkages.

U.S. Pat. No. 5,395,886 (Dow Corning) discloses a method of modifying partially-fluorinated hydrocarbon polymers to provide latent reactive substituents and polymers crosslinked by means of those substituents. The latent reactive substituents are appended by nucleophilic addition subsequent or concurrent to dehydrofluorination of the polymer. The reference does not disclose a polymer membrane sufficiently substituted with acidic functions to function as an ion conducting membrane.

U.S. Pat. No. 5,656,386 (Paul Scherrer Institut) discloses fluoropolymer membranes having various functional groups appended by a radiation grafting method.

SUMMARY OF THE INVENTION

Briefly, the present invention provides a method of making an acid functional fluoropolymer by: a) dehydrofluorinating a starting fluoropolymer with a dehydrofluorinating agent to form an unsaturated fluoropolymer; b) adding an acidifiable nucleophilic functionalizing agent to a double bond of the unsaturated fluoropolymer; and c) acidifying the added acidifiable function.

In another aspect, the present invention provides acid functional fluorocarbon membranes for use as ion conducting membranes in electrochemical cells.

In another aspect, the present invention provides a method of making an ion conducting membrane (ICM) by: a) dehydrofluorinating a starting fluoropolymer with a dehydrofluorinating agent to form an unsaturated fluoropolymer; b) adding an acidifiable nucleophilic functionalizing agent to a double bond of the unsaturated fluoropolymer to form a fluoropolymer bearing an acidifiable function; c) forming the fluoropolymer bearing an acidifiable function into a membrane; and d) acidifying said acidifiable function to form an ICM.

In another aspect, the present invention provides acid functional fluoropolymers having pendent groups according to the formula: —X—Ar—A$_n$, wherein X is selected from O, S or NR, where R is selected from H and C1–C30 alkyl or aryl, which are optionally substituted, wherein Ar is a C6–C30 aromatic group, which is optionally substituted, wherein A is an acidic function or salt thereof, wherein a can be independently chosen to be 1, 2 or 3; and wherein said acid functional fluoropolymer is sufficiently acidified as to meet a condition selected from: a) the equivalent weight of the polymer is 5000 or less; and b) the proton conductivity of the polymer at 25° C. is 0.01 Siemens per centimeter (S/cm) or higher. In addition, ion conducting membranes of such acid functional fluoropolymers are provided.

What has not been described in the art, and is provided by the present invention, is a method of providing acid functionalized fluoropolymer materials usable as ion conducting membranes, such as those used in electrolytic cells.

In this application,

"acidifiable" group, function or agent means either a) an acid-receiving group which is readily capable of substitution with an acid function, preferably by exposure to an acid, such as an aromatic group which may be acidified by treatment with sulfuric acid, or b) a protoacid function which is capable of facile conversion to an acid, preferably by hydrolysis, such as a sulfonyl halide, but preferably a);

"equivalent weight" means the mass of an acidic material that contains one mole of acid functional groups; and when used without reference to a particular substituent, "substituted" means, for a chemical species, substituted by conventional substituents which do not interfere with the desired product or process, e.g., substituents can be alkyl, alkoxy, aryl, phenyl, halo (F, Cl, Br, I), cyano, nitro, etc.

It is an advantage of the present invention to provide fluoropolymer ion conducting membranes for use in an electrolytic cell. It is a further advantage to provide a simple synthetic route to such membranes.

Detailed Description of Preferred Embodiments

Figure 1:
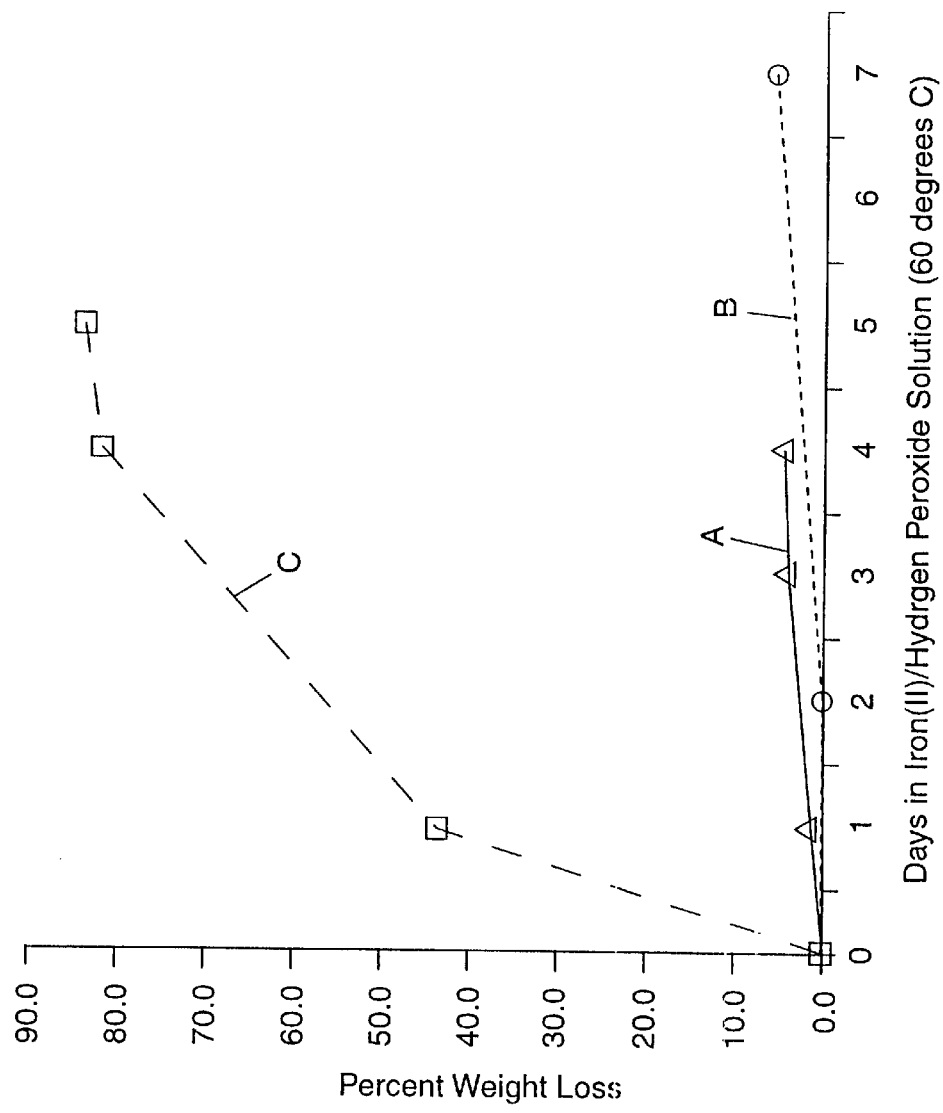
FIG. 1 is a chart of weight loss vs. time under oxidative conditions for one membrane of the present invention (Trace A) and two comparative membranes (Traces B and C).

The present invention provides a method of making an acid functional fluoropolymer by: a) dehydrofluorinating a starting fluoropolymer with a dehydrofluorinating agent to form an unsaturated fluoropolymer; b) adding an acidifiable nucleophilic functionalizing agent to a double bond of the unsaturated fluoropolymer; and c) acidifying the added acidifiable function.

Starting Fluoropolymer

The starting polymer may be any fluoropolymer having hydrogen and fluorine substituents on adjacent carbons, where the hydrogen and fluorine may be abstracted to form a double bond. These >CH—CF< moieties preferably occur in the polymer backbone but may also occur in pendant groups or branches. Preferably the starting fluoropolymer is between 50% and 95% fluorinated, i.e. between 50% and 95% of C—H bonds are replaced with C—F bonds. More preferably the starting fluoropolymer is between 50% and 80% fluorinated and most preferably 65–175%. The starting fluoropolymer may be additionally substituted but is preferably not additionally substituted.

Preferably, the starting polymer is a polymer or copolymer of vinylidene fluoride (1,1-difluoroethene). More preferably, the starting polymer is a copolymer of vinylidene fluoride and hexafluoropropene, such as Fluorel™ (Dyneon Corp., Oakdale, Minn.), THV ™ (Dyneon Corp., Oakdale, Minn.), or Viton ™ (DuPont de Nemours and Co., Wilmington, Del.).

The starting polymer is preferably in the form of a membrane which is advantageously impervious or substantially impervious to passage of gasses, particularly reactant gasses used in electrochemical cells, such as air, oxygen, hydrogen, chlorine, and the like. The membrane is preferably 200 μm or less in thickness, more preferably 50 μm or less and most preferably 25μm or less.

Dehydrofluorinating and Functionalizing Agents

The dehydrofluorinating agent may be any species capable of abstracting a hydrogen from the starting fluoropolymer, including strong bases. The nucleophilic functionalizing agent may be any species capable of addition to a double bond of the fluoropolymer, in keeping with the method of the present invention. Preferably the dehydrofluorinating agent and the nucleophilic functionalizing agent are one and the same.

Preferably the functionalizing agent comprises a nucleophilic group such as an anionic nitrogen-, oxygen- and/or sulfur-containing group, preferably an oxide or sulfide group, and most preferably oxide. Any suitable counter ion may be used.

The functionalizing agent comprises an acidifiable group, which may be an acid-receiving group which is readily capable of substitution with an acid function, or a proto-acid function which is readily capable of conversion to an acid, but is preferably an acid-receiving group. Acidifiable groups include those containing aromatic functions, including heteroaromatic functions, preferably C6–C30 aromatic groups and most preferably phenyl. Acidifiable aromatic groups may have electron donating substituents which aid in later addition of an acid group. Proto-acid groups include groups readily hydrolyzable to form acid functional groups such as esters, anhydrides or acid halides, preferably sulfonyihalides and especially sulfonyl chloride. The acidifiable group may be fluorinated.

Preferred acid-receiving functionalizing agents having the formula: —X—Ar, herein X is selected from O, S or NR, where R is selected from H and C 1–C30 alkyl r aryl, which are optionally substituted, and wherein Ar is a C6–C30 aromatic group, which is optionally substituted. This agent may be advantageously substituted with electron donor groups. More preferably, the nucleophilic functionalizing agent is an aryloxide (ArO$^-$). Most preferably, the nucleophilic functionalizing agent is phenoxide (PhO$^-$).

Functionalizing Conditions

The starting fluoropolymer and functionalizing agent may be reacted by any suitable means. The reactants may be combined in solution. A base to absorb HF as formed during dehydrofluorination may be advantageously employed, such as $Li_2CO_3$. The resulting product solution may be decanted and the solvent removed to yield the product resin.

The steps of a) dehydrofluorinating the starting fluoropolymer and b) adding an acidifiable nucleophilic functionalizing agent to a double bond of the unsaturated fluoropolymer can be carried out sequentially or simultaneously.

Fluoropolymers functionalized with acid-receiving groups may be acidified by any suitable means, including exposure to sulfuric, phosphoric or other acids which may bind covalently to the acidifiable group. Preferably, the functionalized polymer is immersed in concentrated and/or fuming sulfuric acid for 24 hours or more at 25° C. or higher temperature.

The equivalent weight of an acidic material is the mass that contains one mole of acidic hydrogen. The equivalent weight of an ion conducting membrane is the number of acidic group equivalents in the polymeric membrane divided by the weight of the polymer. Lower values of equivalent weight generally correspond with increased ionic conductivity. The materials according to the present invention can be advantageously made having an equivalent weight of 5000 or less, more preferably 3000 or less, even more preferably 1600 or less, and most preferably 1250 or less while maintaining sufficient mechanical strength and dimensional stability for use as an ICM.

Polymers with high proton conductivity are desirable for use in an ICM. High proton conductivity with low resistive loss is advantageous to support high current levels in fuel cell use. The materials according to the present invention can be made having an ionic conductivity of 0.01 Siemens per centimeter (S/cm) or greater at room temperature (25° C.), more preferably 0.05 S/cm or greater, and most preferably 0.10 S/cm or greater. For lithium ion conducting membranes, ionic conductivity is preferably 0.04 mS/cm or greater at room temperature, more preferably 0.3 mS/cm or greater. The ionic conductivity is preferably the same or higher in the operating temperature range of the electrochemical device in which the ICM is used.

The fluoropolymer may be blended with a second polymer after reaction with the functionalizing agent and preferably before any acidification step. Any suitable second polymer may be used, but fluoropolymers suitable as starting fluoropolymers, as described above, are preferred. Blending may be accomplished by any suitable method.

The fluoropolymer may be crosslinked using any suitable crosslinking agent or method, including free radical and nucleophilic processes. Preferred crosslinking agents include Bisphenol AF. Crosslinking may be carried out at any step of the functionalizing process. The fluoropolymer is preferably not crosslinked through the functionalizing agent. The fluoropolymer is preferably not crosslinked through an acid group added according to the method of the present invention.

Each step may be performed batchwise or in continuous fashion.

Ion Conducting Membranes

The method of the present invention is especially useful in the fabrication of ion conducting membranes (ICM's). ICM's may be made according to the present invention by acidification of a fluoropolymer with acid functional groups including carboxyl, sulfonyl, and/or phosphonyl groups, preferably sulfonyl groups. Most preferably, a suitable fluoropolymer is functionalized with an aryloxide, most preferably phenoxide, and then sulfonated, as described above and in the Examples below.

The starting fluoropolymer may be formed into a membrane by any suitable means, including casting, coating, pressing, extruding, and the like, but most preferably coating. Membrane formation may be carried out prior to addition of the acidifiable function, after addition of the acidifiable function but prior to acidification, or after acidification. Preferably, the polymer is formed into a membrane after functionalization but prior to acidification. Most preferably, the acidifiable function is added to the polymer in solution, the polymer is then cast or coated to form a membrane, and then the membrane is acidified. Such membranes are hydrated or saturated with liquid to become ion conducting.

The resulting functionalized polymer membrane is advantageously impervious or substantially impervious to passage of gasses, particularly reactant gasses used in electrochemical cells, such as air, oxygen, hydrogen, chlorine, and the like. The membrane is preferably 200 $\mu$m or less in thickness, more preferably 50 $\mu$m or less and most preferably 25 $\mu$m or less. Advantageously, the membrane is essentially non-conductive to electricity.

ICM's advantageously have a low equivalent weight, a high ionic conductivity, high stability under oxidative conditions, sufficient mechanical strength, and stability under high temperature conditions.

Proton conducting membranes may be converted so as to conduct other cations by any suitable method of ion exchange, such as soaking in a solution of the hydroxide of the cation to be introduced to the membrane.

ICM's of the present invention preferably demonstrate high oxidative stability, preferably retaining 90% or more of their original weight after exposure to a 3% hydrogen peroxide solution containing 4 ppm iron sulfate at 68° C. for seven days and more preferably retaining 95% or more of their original weight.

This invention is useful in synthesizing functionalized fluoropolymers, in particular acid functional fluoropolymer membranes for use as ion conducting membranes in electrochemical cells such as hydrogen fuel cells or lithium ion batteries.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all chemicals and reagents were obtained or are available from Aldrich Chemical Co., Milwaukee, Wiss.

Example 1

Functionalized fluoropolymer films according to the present invention having sulfonated phenoxy substituents were made and tested along with comparative films, as described in Table 1 and the text following.

Membranes Nos. 22C and 23C appearing in Table 1 are two commercially available comparative membranes: Nafion™ 117 (DuPont Chemicals, Wilmington, Del., available from ElectroChem, Inc., Woburn, Mass., and Aldrich Chemical Co., Inc., Milwaukee, Wis.) and Bio-Rex™ Ion Exchange Membrane AG 50W-18 (Bio-Rad, Hercules, Cali.).

RT indicates room temperature, i.e., about 25° C.

TABLE I

| No. | FP | FP/phenoxide weight ratio | Blended with Second FP | Crosslinker | $H_2SO_4$ time/temp | Equivalent Weight (g/mol) | Conductivity (mS/cm) |
|---|---|---|---|---|---|---|---|
| 1 | FC2145 | 68.7/31.3 | none | none | 1 day/RT | | 17.4(25° C.) |
| 2 | FC2145 | 68.7/31.3 | none | none | 2 days/RT | 2154 | 26.8(25° C.) |
| 3 | FC2145 | 68.7/31.3 | none | none | 4 days/RT | | |
| 4 | FC2145 | 84.8/15.2 | none | none | 3 days/RT | 2800 | 1.0(25° C.)/1.2(80° C.) |
| 5 | FC2145 | 84.8/15.2 | none | none | 7 days/RT | | |
| 6 | FC2145 | 84.8/15.2 | none | 9.8% | 7 days/RT | | 17(25° C.)/28(80° C.) |
| 7 | FC2145 | 68.7/31.3 | none | none | 5 days/RT | 656 | |
| 8 | FC2145 | 68.7/31.3 | 10% FC2145 | none | 5 days/RT | | |
| 9 | FC2145 | 68.7/31.3 | none | 2% | 5 days/RT | | |
| 10 | FC2145 | 68.7/31.3 | none | 4% | 5 days/RT | | |
| 11 | FC2145 | 68.7/31.3 | none | 10% | 5 days/RT | | |
| 12 | FC2145 | 68.7/31.3 | 10% FC2178 | 10% | 3 days/RT | 850 | |
| 13 | FC2145 | 68.7/31.3 | 20% FC2145 | 10% | 3 days/RT | 1100 | |
| 14 | FC2145 | 68.7/31.3 | none | none | 1 day/50° C. | 843 | |
| 15 | FC2145 | 68.7/31.3 | 20% FC2178 | 10% | 3 days/50° C. | 1070 | 65(25° C.)/94(82° C.) |

TABLE I-continued

| No. | FP | FP/phenoxide weight ratio | Blended with Second FP | Crosslinker | H$_2$SO$_4$ time/temp | Equivalent Weight (g/mol) | Conductivity (mS/cm) |
|---|---|---|---|---|---|---|---|
| 16 | FC2145 | 68.7/31.3 | 20% THV-200 | 10% | 1 day/50° C. | 1545 | |
| 17 | FC2145 | 68.7/31.3 | 20% THV-200 | none | 1 day/50° C. | | |
| 18 | FC2145 | 68.7/31.3 | 25% THV-200 | 2% | 1 day/50° C. | | |
| 19 | FC2178 | 68.7/31.3 | none | 2% | 1 day/50° C. | 710 | |
| 20 | FC2178 | 68.7/31.3 | 10% FC2178 | 2% | 1 day/50° C. | 748 | |
| 21 | FC2178 | 68.7/31.3 | 10% THV-200 | 2% | 1 day/50° C. | 1000 | |
| 22C | | | Nafion 117 | | | 1100 | 83(25° C.) |
| 23C | | | Bio-Rex Ag50W-18 | | | 300 | 4(25° C.)/8(80° C.) |

Phenoxy-Substituted Fluoropolymers

Two fluoropolymer resins were used, Fluorel FC2145 and Fluorel FC2178. For each membrane in Table 1, a weighed amount of the indicated fluoropolymer resin (FP) was dissolved in methyl ethyl ketone (MEK) at a concentration of roughly 15% by weight. A volume of 1 M lithium phenoxide solution in THF (Aldrich Chemical Co., Milwaukee, Wiss.) was added, to provide the indicated weight ratio of fluoropolymer to phenoxide. Two equivalents (based on Li phenoxide) of Li$_2$CO$_3$ were added. The solution was heated to reflux and stirred by a mechanical stirrer for 3–5 days. The solution was then left sitting at room temperature overnight to allow the Li$_2$CO$_3$ to settle. The resulting yellow/brown solution was then decanted and the solvent was removed under an aspirator and then a vacuum pump to yield a brown resin. Where blending with a second fluoropolymer is indicated in Table 1, the resin was redissolved in MEK, blended by stirring with the indicated amount (as wt % of the original polymer) of the indicated second fluoropolymer, and then the solvent was again removed under an aspirator and then a vacuum pump. The second fluoropolymers were selected from Fluorel FC2145, Fluorel FC2178 and THV-200. Where crosslinking is indicated in Table 1, the resin was redissolved in MEK and the indicated amount (as wt % of the original polymer) of Bisphenol AF was added (obtained from Asahi Glass, Tokyo, Japan), and the solvent was again removed under an aspirator and then a vacuum pump. The crosslinker was activated by heat after the polymer was cast into a membrane.

For membranes made using FC2178 as the starting polymer it was found that the polymer did not remain in solution but precipitated out upon reaction with the phenoxide. It was found that the product remained in solution when MEK was replaced with a mixture of solvents composed of 1 part (by weight) MEK, 1 part THF, 0.1 part toluene, and 0.25 part methanol. Membranes Nos. 19–21 in Table 1 were made and handled using this solvent mixture.

Phenoxy-Substituted Fluoropolymer Films

The resulting resins were pressed into films in a Carver press between two plates at a temperature of at least 100° C. The resulting films were cut into pieces of about 30 to 60 square centimeters.

Sulfonated Phenoxy-Substituted Fluoropolymer Films

The resulting film pieces were sulfonated by immersion in an 80/20 mixture of concentrated H$_2$SO4/ fuming H$_2$SO$_4$ for the duration and temperature indicated in Table 1, then rinsed until pH stable.

Ionic Conductivity Measurements

Conductivity measurements were made according to the following procedure, which is based on T. Zawodzinski et. al., J. Phys. Chem., vol. 95, p. 6040 et seq. (1991). Prior to testing, the membrane sample was boiled in deionized water for 2 hours. A membrane sample 1 cm wide and at least 2 cm long was clamped at each end by two Pt electrodes, 2 cm apart, contacting the membrane surface. The cell was submersed in water and the ohmic and capacitive components of the membrane impedance were measured by impedance spectroscopy at a frequency range of from 65 kHz to 0.1 Hz using a Solartron frequency analyzer (Solartron, UK). Data were collected at 25° C. unless otherwise specified. A Nyquist plot, which is a plot of imaginary vs. real impedance, was generated for each cell. The resulting curve was extrapolated to zero capacitance, which point represents the pure ohmic resistance. Conductivity in S/cm is calculated from the calculated value of pure ohmic resistance and the cell constant: Conductivity=2/((resistance)×(membrane thickness)).

Equivalent Weight Measurements

Membrane samples were weighed and then suspended in about 60 ml of water and titrated with 0.1IN NaOH to determine the molar amount of acid groups (sulfate) in the membrane sample. Equivalent weight (EW) is determined by dividing the weight in grams by the amount in moles of acid groups.

Oxidative Stability Measurements

Oxidative stability measurements were made according to the following procedure, which is based on LaConti, Electrochem. Soc. Proc., Vol. 77-6, p. 354 (1977). Membrane samples were dried under an aspirator and then a vacuum pump, and weighed. The samples were then placed in a 3% hydrogen peroxide solution containing 4 ppm iron sulfate and heated to 68° C. At measured time intervals, samples were removed, washed with water, dried under an aspirator and then a vacuum pump, and re-weighed. FIG. 1 shows weight loss for membrane No. 4 of the invention (Trace A) and comparative membranes 22C (Nafion) (Trace B) and 23C (Bio-Rex) (Trace C). While the Bio-Rex membrane (No. 23C) lost over 80% of its original weight due to oxidative degradation, membrane No. 4 of the present invention showed little weight loss and compares well to the Nafion membrane (No. 22C).

Example 2

Preparation and Testing of L$^+$ Single Ion Conducting Membranes

A sample of film # 12 from Example 1 was dried in air and then soaked in 0.08M LiOH for 30 minutes at room temperature. The sample was then washed three times with DI water until the pH of the wash water remained stable. The film was then dried under vacuum for 17 hours and placed in a glove box. The film was cut in two pieces, Sample A (0.0759g) was soaked in a solution of IM BETI (bis-perfluoroethyl sulfonylimide, lithium salt) in 50:50 ethylene carbonate/dimethyl carbonate (ECIDMC), and sample B (0.1524g) was soaked in 50:50 EC/DMC. After 3 days the film samples were removed. Sample A weighed 0.1680 (121% increase) and sample B weighed 0.3683g (119% increase). Both samples were 0.005 mm thick. Conductivity was measured according to the following method: For Li ion conducting films the conductivity was measured in a dry box. The film was placed between two circular stainless steel electrodes (5.06 $cm^2$) and the conductivity was measured using a Princeton Applied Research (PAR) potentiostatl galvanometer model 273 with a Schlumberger model 1260 frequency response analyzer. The impedance responses of cells were measured over a frequency range of 100,000 to 1 Hz. Conductivity was calculated from the ohmic resistance using the formula: 1/s(conductivity S/cm)=1(film thickness in cm)/a(film area in $cm^2$)×R(ohms). The measured $Li^+$ conductivity for Sample A was $3 \times 10^{-4}$ S/cm and for Sample B was $4 \times 10^{-5}$ S/cm.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of making an acid functional fluoropolymer comprising the steps of:
   a) dehydrofluorinating a starting fluoropolymer with a dehydrofluorinating agent to form an unsaturated fluoropolymer;
   b) adding an acidifiable nucleophilic functionalizing agent to a double bond of the unsaturated fluoropolymer to form a fluoropolymer bearing an acidifiable function, wherein said acidifiable nucleophilic functionalizing agent is aryloxide ($ArO^-$); and
   c) acidifying said acidifiable function;
   wherein said acid functional fluoropolymer is sufficiently acidified as to meet a condition selected from the group consisting of: a) the equivalent weight of the polymer is 5000 or less; and b) the proton conductivity of the polymer at 25° C. is 0.01 Siemens per centimeter (S/cm) or higher.

2. The method of claim 1 wherein the starting fluoropolymer is a polymer or copolymer of vinylidene fluoride (1,1-difluoroethene).

3. The method of claim 1 wherein the starting fluoropolymer and the acid functional fluoropolymer are membranes.

4. The method of claim 1 wherein said acidifiable nucleophilic functionalizing agent is phenoxide ($PhO^-$).

5. The method of claim 1 wherein said acid functional fluoropolymer has an equivalent weight of 3000 g/mol or less.

6. The method of claim 1 wherein said acid functional fluoropolymer has an equivalent weight of 1600 g/mol or less.

7. The method of claim 1 additionally comprising the step of:
   d) cation exchange.

8. The method of claim 7, wherein said cation exchange yields a acid functional fluoropolymer which is a $Li^+$ salt.

9. A method of making an acid functional fluoropolymer comprising the steps of:
   a) adding an acidifiable function to a fluoropolymer to form; fluoropolymer bearing an acidifiable function; and
   b) acidifying said acidifiable function; wherein said acid functional fluoropolymer is sufficiently acidified as to meet a condition selected from the group consisting of: a) the equivalent weight of the polymer is 5000 or less; and b) the proton conductivity of the polymer at 25° C. is 0.01 Siemens per centimeter (S/cm) or higher;
   wherein said acidifiable function is a group according to the formula: —X—Ar, wherein X is O, S or NR, where R is H or C1–C30 alkyl or aryl, which are optionally substituted, wherein Ar is a C6–C30 aromatic group, which is optionally substituted.

10. The method of claim 9, wherein X is O.

11. The method of claim 10, wherein Ar is phenyl.

* * * * *

UNITED STATES PATENT AND TRADEMARK OFFICE
CERTIFICATE OF CORRECTION

PATENT NO. : 6,423,784 B1
DATED : July 23, 2002
INVENTOR(S) : Hamrock, Steven J.

It is certified that error appears in the above-identified patent and that said Letters Patent is hereby corrected as shown below:

Drawings,
Figure #1, "Hydrgen" should be -- Hydrogen --

Column 2,
Line 10, "Scherrer" should be -- Scherer --
Line 38, "An," should be -- $A_n$, --

Column 3,
Line 35, "65 - 175%" should be -- 65 - 75% --

Column 4,
Line 12, "sulfonyihalides" should be -- sulfonylhalides --
Line 16, "herein" should be -- wherein --
Line 17, "alkyl r ary l" should be -- alkyl or aryl --

Column 6,
Line 33, "Wiss." should be -- Wisc. --
Line 47, "Cali." should be -- Calif. --

Column 7,
Line 21, "Wiss." should be -- Wisc. --
Lines 31 and 37, "redisolved" should be -- redissolved --
Line 61, "H2SO4" should be -- $H_2SO_4$ --

Column 8,
Line 36, "0.1lN" should be -- 0.1N --
Line 62, "L$^+$" should be -- $Li^+$ --

Column 9,
Line 3, "lM" should be -- 1M --
Line 5, "(EClDMC)" should be -- (EC/DMC) --
Line 14, "potentiostat1" should be -- potentiostat/ --
Line 43, "agent is aryloxide" should be -- agent contains an aryloxide ion --

UNITED STATES PATENT AND TRADEMARK OFFICE
CERTIFICATE OF CORRECTION

PATENT NO. : 6,423,784 B1
DATED : July 23, 2002
INVENTOR(S) : Hamrock, Steven J.

It is certified that error appears in the above-identified patent and that said Letters Patent is hereby corrected as shown below:

<u>Column 10,</u>
Lines 12-13, "acidifiable nucleophilic functionalizing agent" should be
-- aryloxide ion --
Line 24, "a acid" should be -- an acid --

Signed and Sealed this

Sixth Day of July, 2004

JON W. DUDAS
*Acting Director of the United States Patent and Trademark Office*